(12) United States Patent
Yamaguchi (10) Patent No.: US 9,554,002 B2
(45) Date of Patent: Jan. 24, 2017

(54) PORTABLE TERMINAL AND METHOD

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/152,412

(22) Filed: May 11, 2016

(65) Prior Publication Data

US 2016/0337533 A1 Nov. 17, 2016

(30) Foreign Application Priority Data

May 11, 2015 (JP) .................................. 2015-096423

(51) Int. Cl.
*H04N 1/00* (2006.01)
(52) U.S. Cl.
CPC ...... *H04N 1/00307* (2013.01); *H04N 1/00106* (2013.01); *H04N 2201/0094* (2013.01)
(58) Field of Classification Search
CPC ............ H04N 1/00307; H04N 1/00106; H04N 2201/0094
USPC ........................................................ 358/1.15
See application file for complete search history.

(56) References Cited

U.S. PATENT DOCUMENTS

| | | | |
|---|---|---|---|
| 6,580,460 B1* | 6/2003 | Takahashi | H04N 1/00885 348/372 |
| 2009/0307322 A1* | 12/2009 | Iwasawa | G11B 27/034 709/206 |
| 2010/0265351 A1* | 10/2010 | Kaibara | G06F 17/30244 348/222.1 |
| 2015/0038076 A1* | 2/2015 | Naruse | H04W 4/008 455/41.1 |

FOREIGN PATENT DOCUMENTS

JP H10-269459 A 10/1998

* cited by examiner

*Primary Examiner* — Allen H Nguyen
(74) *Attorney, Agent, or Firm* — Hawaii Patent Services; Nathaniel K. Fedde; Kenton N. Fedde (57) ABSTRACT

Provided is a portable terminal capable of efficiently storing untransmitted print object data as print data in a non-volatile storage unit, and restarting printing by the print object data. Included are a storage unit, a remaining battery capacity detection unit, a print data construction unit that constructs the print data in each [print unit size] from a data start position of the print object data and transmits the print data to an image forming device, and a data storage processing unit that performs a data storage process in which the print object data is stored in the storage unit in each [storage unit size] toward the data start position from a data end position of the print object data when a remaining battery capacity is smaller than or equal to a preset reference value during transmission of the print data by the print data construction unit.

6 Claims, 12 Drawing Sheets

PORTABLE TERMINAL AND METHOD

INCORPORATION BY REFERENCE

This application is based on and claims the benefit of priority from Japanese Patent Application No. 2015-096423 filed on May 11, 2015, the contents of which are hereby incorporated by reference.

BACKGROUND

The present disclosure relates to a portable terminal and method capable of operating an image forming device.

Recently, a technology is known in which print data is constructed from print object data such as document data in a portable terminal that is driven by a battery as a power supply, such as a smartphone or a notebook personal computer, and the constructed print data is transmitted to an image forming device such as a printer, a copy machine, or an MFP (Multifunction Peripheral/Printer/Product) via a wired network or a wireless network, and printed. Various print object data are used, and in the case of print object data exclusively prepared for printing, such as an Internet payment screen or a coupon screen, when the printing is finished, the print object data is not required. Therefore, in general, the print object data is stored in a volatile area and when the printing is finished, the print object data is eliminated. Accordingly, while the print object data stored in the volatile area is transmitted as print data, when a battery runs out, the original print object data for constructing the print data is lost. To deal with the problem, a technology is proposed in which when reduction in a remaining battery capacity on the portable terminal side is detected during the printing, the print object data is stored in a non-volatile area and a printing operation is restarted after power recovery.

SUMMARY

According to the present disclosure, a portable terminal that uses a battery as a power supply, constructs print data from print object data stored in a volatile storage unit, transmits the print data to an image forming device, and instructs the image forming device to perform printing of the print data, includes a non-volatile storage unit, a remaining battery capacity detection unit that detects a remaining battery capacity of the battery, a print data construction unit that constructs the print data in each print unit size from a data start position of the print object data and transmits the print data to the image forming device, and a data storage processing unit that performs a data storage process in which the print object data is stored in the non-volatile storage unit in each storage unit size toward the data start position from a data end position of the print object data when the remaining battery capacity detected by the remaining battery capacity detection unit is smaller than or equal to a preset reference value during transmission of the print data by the print data construction unit.

Further, according to the present disclosure, a method for instructing a portable terminal to construct print data from print object data stored in a volatile storage unit, transmit the print data to an image forming device, and perform a print data transmission operation in which the image forming device is instructed to perform printing of the print data includes instructing the portable terminal including a battery as a power supply, the volatile storage unit, and a non-volatile storage unit to function as a print data construction unit, construct the print data in each print unit size from a data start position of the print object data, and transmit the print data to the image forming device, and instructing the portable terminal to function as a data storage processing unit and store the print object data in the non-volatile storage unit in each storage unit size toward the data start position from a data end position of the print object data when a remaining battery capacity detected by a remaining battery capacity detection unit is smaller than or equal to a preset reference value during transmission of the print data.

DETAILED DESCRIPTION

Hereinafter, an embodiment of the present disclosure is described in detail with reference to the accompanying drawings. In the following embodiment, the same reference number is allocated to the same component.

Figure 1:
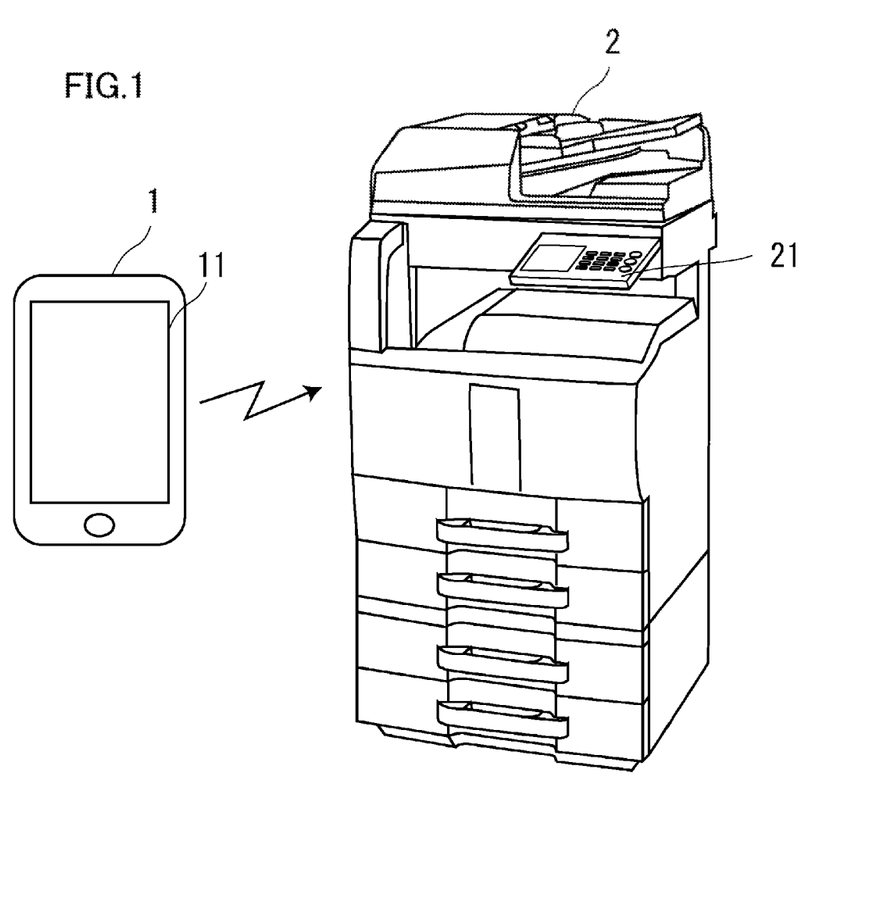
FIG. 1 is a system configuration diagram of a printing system including an embodiment of a portable terminal and an image forming device according to the present disclosure.

As illustrated in FIG. 1, an image forming system includes a portable terminal 1 and an image forming device 2 connected to the portable terminal 1 via a wireless network or the like. The image forming device 2 is a device having a communication function and a print function, such as a printer, a copy machine, or an MFP (Multifunction Peripheral/Printer/Product). Further, the image forming device is configured to be operable from the portable terminal 1 and also operable from an operation panel 21.

Figure 2:
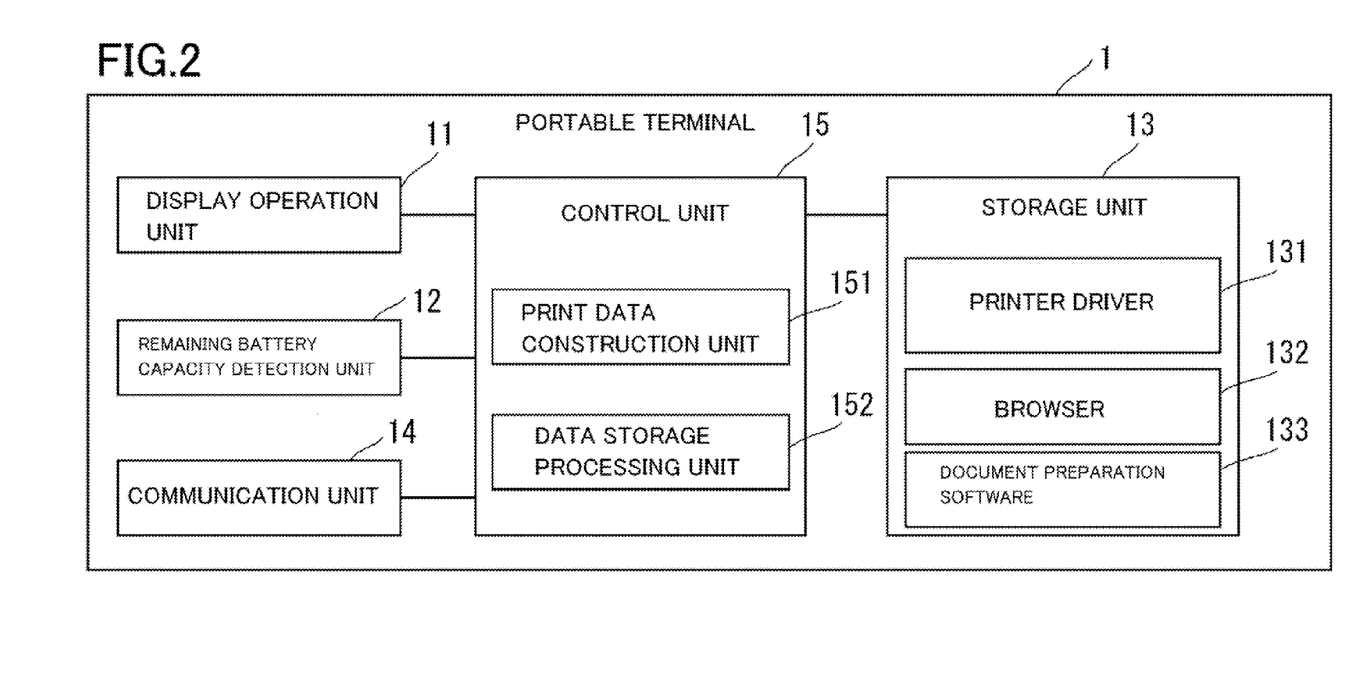
FIG. 2 is a block diagram illustrating a configuration of a portable terminal illustrated in FIG. 1.

The portable terminal 1 is a portable device that uses a battery as a power supply, such as a mobile phone, a smartphone, a tablet terminal, or a PDA (Personal Digital Assistant). As illustrated in FIG. 2, the portable terminal 1 includes a display operation unit 11, a remaining battery capacity detection unit 12, a storage unit 13, a communication unit 14, and a control unit 15.

The display operation unit 11 is a user interface including a display unit that displays a variety of information, and a variety of operating keys. The display unit may be a touch panel that functions as a displaying means and an inputting means in which a transparent pressure sensor is provided on a surface of a display panel.

The remaining battery capacity detection unit 12 detects a remaining battery capacity of the portable terminal 1 and notifies the control unit 15 of the detected remaining battery capacity. Further, detection of the remaining battery capacity may be performed on the basis of measurements of an inter-terminal voltage or an internal resistance of the battery, or on the basis of measurements of a current flowing in and out of the battery. Further, the remaining battery capacity is detected in arbitrary units of percentage in which a full charge is defined as 100, electric energy [Wh], or the like. The remaining battery capacity detection unit 12 of the present embodiment detects the remaining battery capacity by percentage.

The storage unit 13 is a non-volatile storage unit such as a semiconductor memory or an HDD (Hard Disk Drive). In the storage unit 13, a printer driver 131 is stored. The printer driver 131 is an application program for transmitting print data to the image forming device 2, and is installed in the portable terminal 1. A user downloads the printer driver 131 from the Internet or the like via the communication unit 14 and installs the printer driver 131 in the portable terminal 1. In addition, in the storage unit 13, browser 132 or document preparation software 133 is stored that is an application program for browsing and editing document data of an HTML format, a Word format of Microsoft Corporation, or the like.

The communication unit 14 has a function of transmitting and receiving a variety of data to and from the image forming device 2 via a wireless network. In addition, the communication unit 14 has a function of connecting to the Internet and has a function of transmitting and receiving a variety of data between the communication unit 14 and an information processing device such as a server connected to the Internet, and the like.

The control unit 15 is connected to the display operation unit 11, the remaining battery capacity detection unit 12, the storage unit 13, and the communication unit 14, respectively. Further, the control unit 15 performs operation control of the entire portable terminal 1 in accordance with specified instruction information input from the display operation unit 11. The control unit 15 is an information processing unit such as a microcomputer having a ROM (Read Only Memory), a RAM (Random Access Memory), and the like. In the ROM, a control program is stored for performing operation control of the portable terminal 1. The control unit 15 reads out a control program stored in the ROM and develops the control program in the RAM, thereby controlling the entire portable terminal 1 in accordance with the specified instruction information input from the display operation unit 11.

Further, when a starting operation of the browser 132 or the document preparation software 133 is performed by the display operation unit 11, the control unit 15 reads out the browser 132 or the document preparation software 133 stored in the storage unit 13, develops it in the RAM, and starts the browser 132 or the document preparation software 133. Thereby, the user displays image data, HTML data, document data, or the like on the display operation unit 11 by the browser 132 or the document preparation software 133, and browses and edits the above data.

The document data in which browsing and editing are performed by the browser 132 or the document preparation software 133 is stored in the RAM that is a volatile storage unit. When the user instructs the document data during browsing (during editing) to be printed by the browser 132 or the document preparation software 133, the control unit 15 reads out the printer driver 131 stored in the storage unit 13, develops it in the RAM, and starts the printer driver 131. Thereby, the control unit 15 functions as a print data construction unit 151 and a data storage processing unit 152 that realize functions of the printer driver 131.

Figure 3:
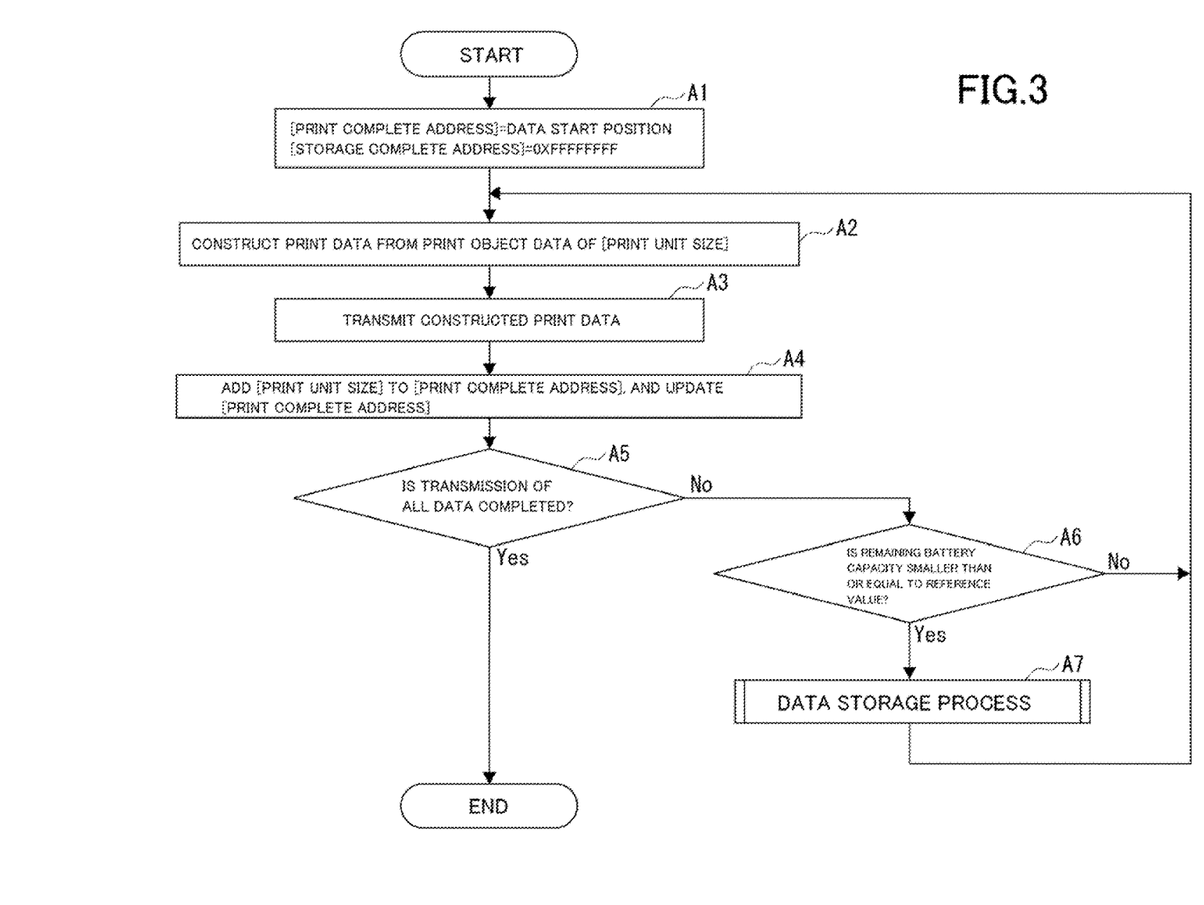
FIG. 3 is a flowchart illustrating a print data transmission operation of a portable terminal illustrated in FIG. 2.
Figure 4A:
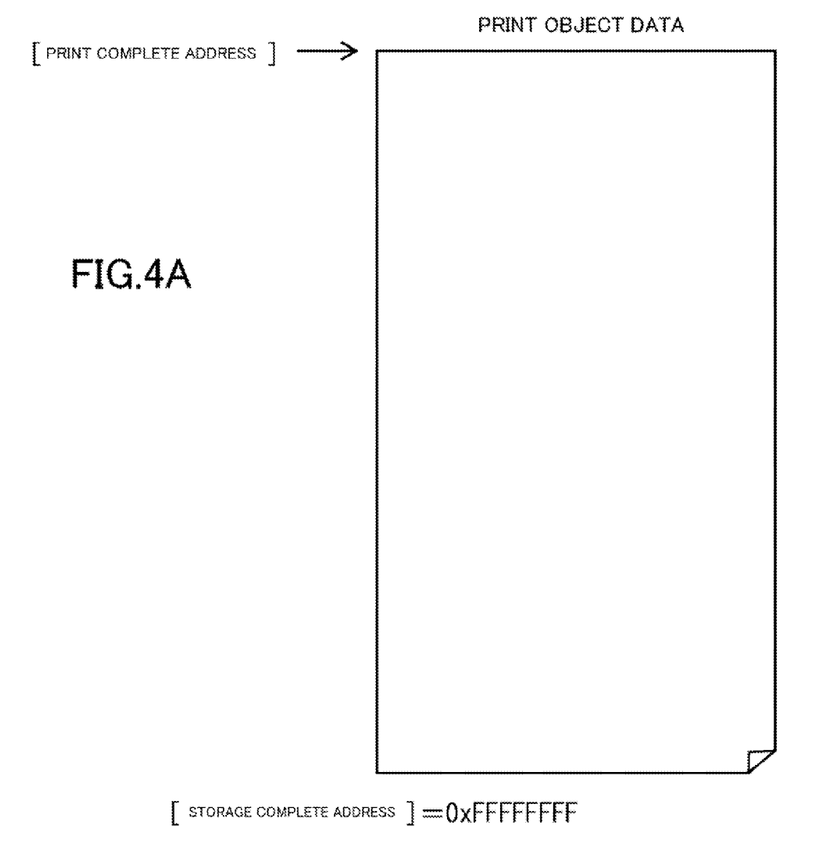
FIG. 4A is an explanatory diagram explaining a transition of a [print complete address] and a [storage complete address] in print object data stored in a RAM of a control unit illustrated in FIG. 2.
Figure 4B:
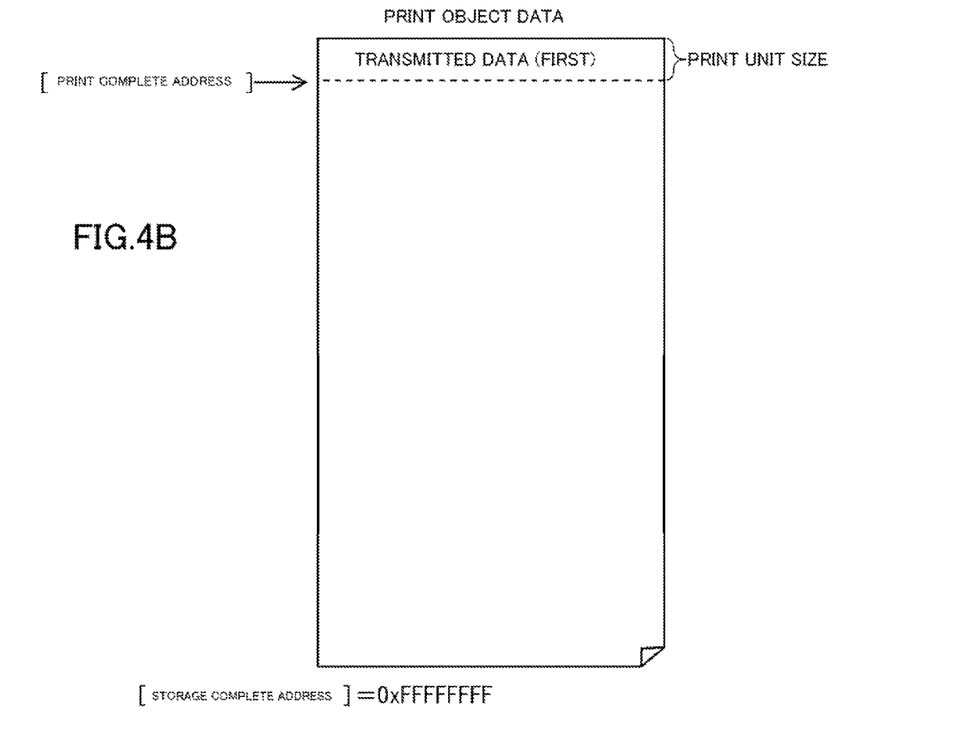
FIG. 4B is an explanatory diagram explaining a transition of a [print complete address] and a [storage complete address] in print object data stored in a RAM of a control unit illustrated in FIG. 2.

Next, a print data transmission operation of the print data construction unit 151 is described in detail with reference to FIGS. 3, 4A, and 4B.

When printing of print object data is instructed, the control unit 15 functions as the print data construction unit 151, and sets a [print complete address] in a data start position and a [storage complete address] in "0xFFFFFFFF", respectively (step A1). The [print complete address] indicates an address in which transmission of the print data is completed with respect to the print object data. Accordingly, when the transmission of the print data is not started, the control unit 15 sets the [print complete address] in the data start position that is a leading address of the print object data, as illustrated in FIG. 4A. Further, the "0xFFFFFFFF" that is set in the [storage complete address] is a temporary value, and set in a value greater than the data end position of the print object data stored in the RAM.

Next, the print data construction unit 151 reads out from the RAM the print object data of a [print unit size] using as a start position the [print complete address], and constructs the print data from the print object data of the read-out [print unit size] (step A2). Further, the [print unit size] is a unit for transmitting the print data and is previously set in a page unit or in a packet unit of a network in a data transmission.

Next, the print data construction unit 151 transmits the constructed print data to the image forming device 2 (step A3), adds the [print unit size] to the [print complete address], and updates the [print complete address] (step A4). In FIG. 4B, a state is illustrated in which first print data is transmitted to the image forming device 2, the [print unit size] is added to the [print complete address] set in the data start position, and the [print complete address] is updated.

Next, the print data construction unit 151 determines whether transmission of all the data of the print object data stored in the RAM has been completed (step A5). If the transmission of all the data has been completed, the print data transmission operation is ended.

If the transmission of all the data is not completed in step A5, the print data construction unit 151 determines whether the remaining battery capacity detected by the remaining battery capacity detection unit 12 is smaller than or equal to a preset reference value (step A6). If the remaining battery capacity is greater than the preset reference value in step A6, the print data construction unit 151 returns to step A2 and then constructs the print data.

If the remaining battery capacity is smaller than or equal to the preset reference value in step A6, the print data construction unit 151 performs a data storage process (step A7). After completion of the data storage process, the print data construction unit 151 returns to step A2 and then constructs the print data.

Next, the data storage process of the data storage processing unit 152 is described in detail with reference to FIGS. 5 to 7A, and 7B.

Figure 5:
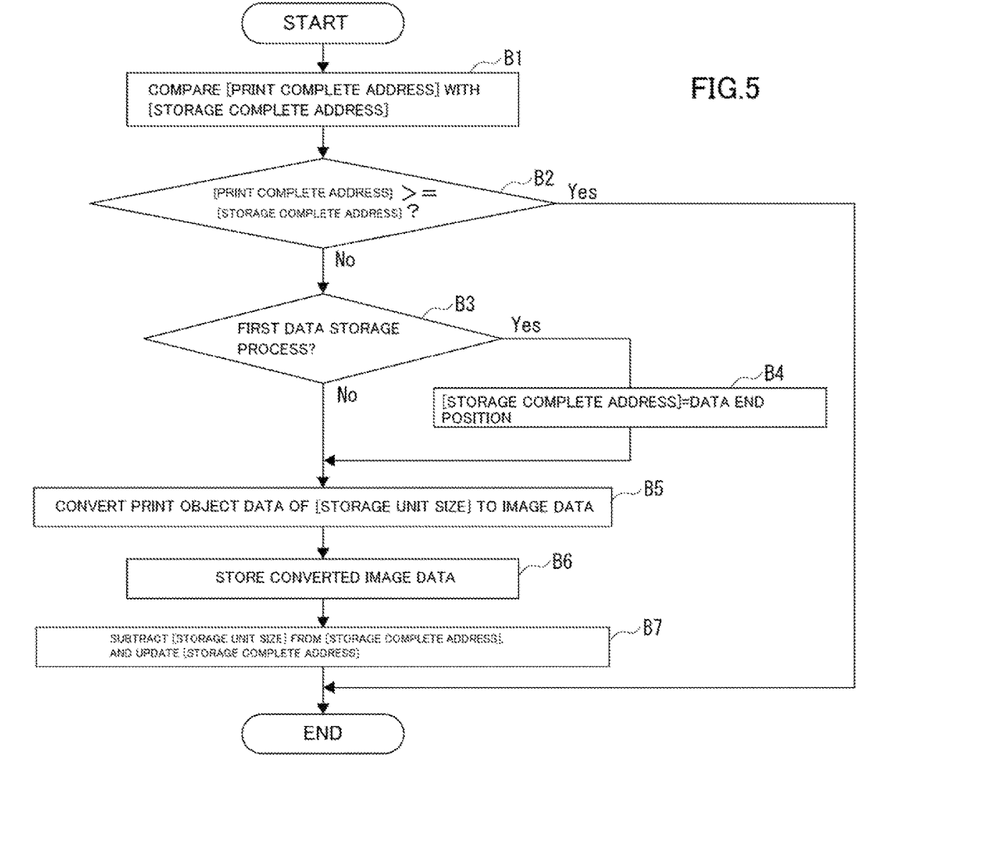
FIG. 5 is a flowchart illustrating a data storage operation in a portable terminal illustrated in FIG. 2.

The control unit 15 functions as the data storage processing unit 152 and compares the [print complete address] with the [storage complete address] (step B1). Further, the control unit 15 determines whether the [print complete address] is greater than or equal to the [storage complete address] (step B2). In the first data storage process, the "0xFFFFFFFF" that is greater than the data end position of the print object data is set as the [storage complete address], and therefore the control unit 15 determines that the [print complete address] is smaller than the [storage complete address] in step B2. Further, when the control unit 15 determines that the [print complete address] is greater than or equal to the [storage complete address] in step B2, all the data of the print object data that is not transmitted as the print data is stored in the storage unit 13. Therefore, the data storage processing unit 152 ends without performing the data storage process.

When it is determined in step B2 that the [print complete address] is smaller than the [storage complete address], the print data construction unit 151 determines whether the data storage process is a first data storage process (step B3). If it is the first data storage process, the print data construction unit 151 sets the [storage complete address] in the data end position of the print object data (step B4).

Next, the data storage processing unit 152 reads out from the RAM the print object data of the [storage unit size] using as an end position the [storage complete address], and converts the read-out print object data to image data of a bit map format or the like (step B5). The [storage unit size] is a unit for storing data in the storage unit 13 that is a non-volatile storage unit, and the [print unit size] is set to a page unit in the present embodiment. When page division data for dividing a page is used in the print object data, a page using as an end position the [storage complete address] is defined as the [storage unit size].

Figure 6A:
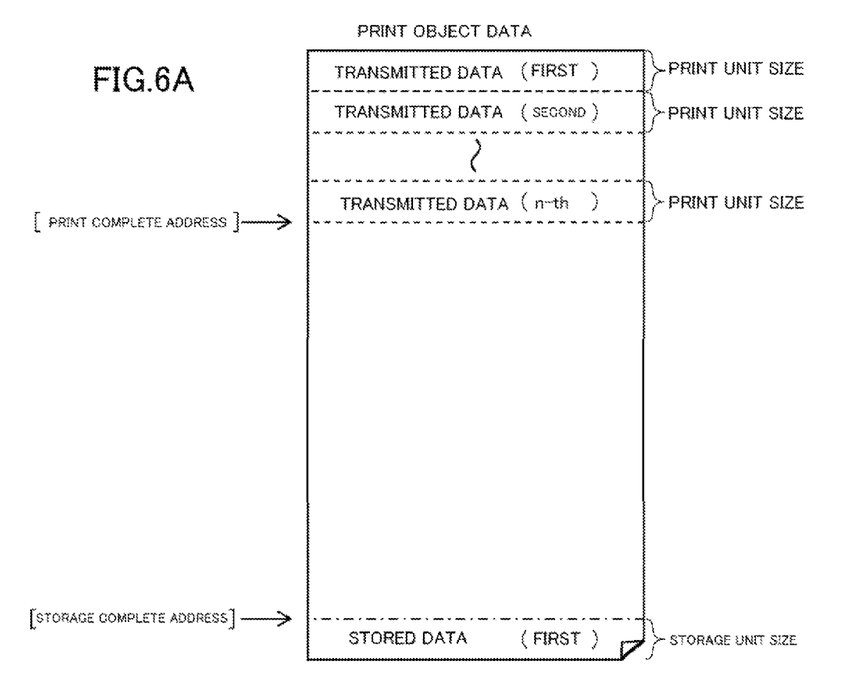
FIG. 6A is an explanatory diagram explaining a transition of a [print complete address] and a [storage complete address] in print object data stored in a RAM of a control unit illustrated in FIG. 2.

Next, the data storage processing unit 152 stores the converted image data in the storage unit 13 (step B6). When the image data is stored, the data storage processing unit 152 may divide the converted image data into a plurality of pieces, and store them in the storage unit 13 in reverse from the data end position. In this case, even if a power source is turned off in the middle of the data storage, as much print object data as possible is stored as the image data, and therefore the possibility capable of restarting printing is raised. Next, the print data construction unit 151 subtracts the [storage unit size] from the [storage complete address], updates the [storage complete address] (step B7), and ends the data storage process. In FIG. 6A, a state is illustrated in which when n-th print data is transmitted to the image forming device 2, it is determined in step 6A that the remaining battery capacity is smaller than or equal to the preset reference value, and the first data storage process is performed. In FIG. 6A, the [print complete address] is set in a position in which n pieces of the [print unit sizes] are added to the data start position, and the set [storage complete address] is set in a position in which a piece of the [storage unit size] is subtracted from the data end position.

When the data storage process is ended, the control unit 15 functions as the print data construction unit 151 again, and performs the construction and the transmission of the print data of steps A2 to A4. Subsequently, the data storage process and the construction and the transmission of the print data are repeated in order until it is determined in step A5 that the transmission of all the data has been completed, or it is determined in step B2 that the [print complete address] is greater than or equal to the [storage complete address].

Figure 6B:
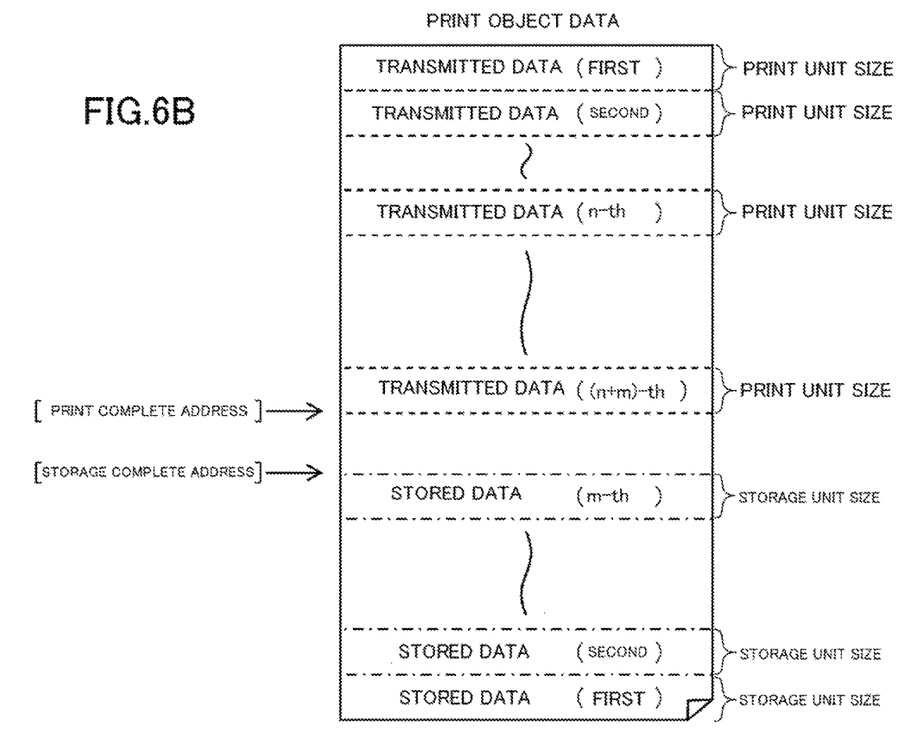
FIG. 6B is an explanatory diagram explaining a transition of a [print complete address] and a [storage complete address] in print object data stored in a RAM of a control unit illustrated in FIG. 2.

In FIG. 6B, a state is illustrated in which after the construction and the transmission of the print data are performed n times, the data storage process and the construction and the transmission of the print data are repeated m times. In FIG. 6B, the [print complete address] is set in a position in which n+m pieces of the [print unit sizes] are added to the data start position, and the set [storage complete address] is set in a position in which m pieces of the [storage unit sizes] are subtracted from the data end position. At this point in time, the [storage complete address] is greater than the [print complete address], and therefore the data storage process is continued.

Figure 7A:
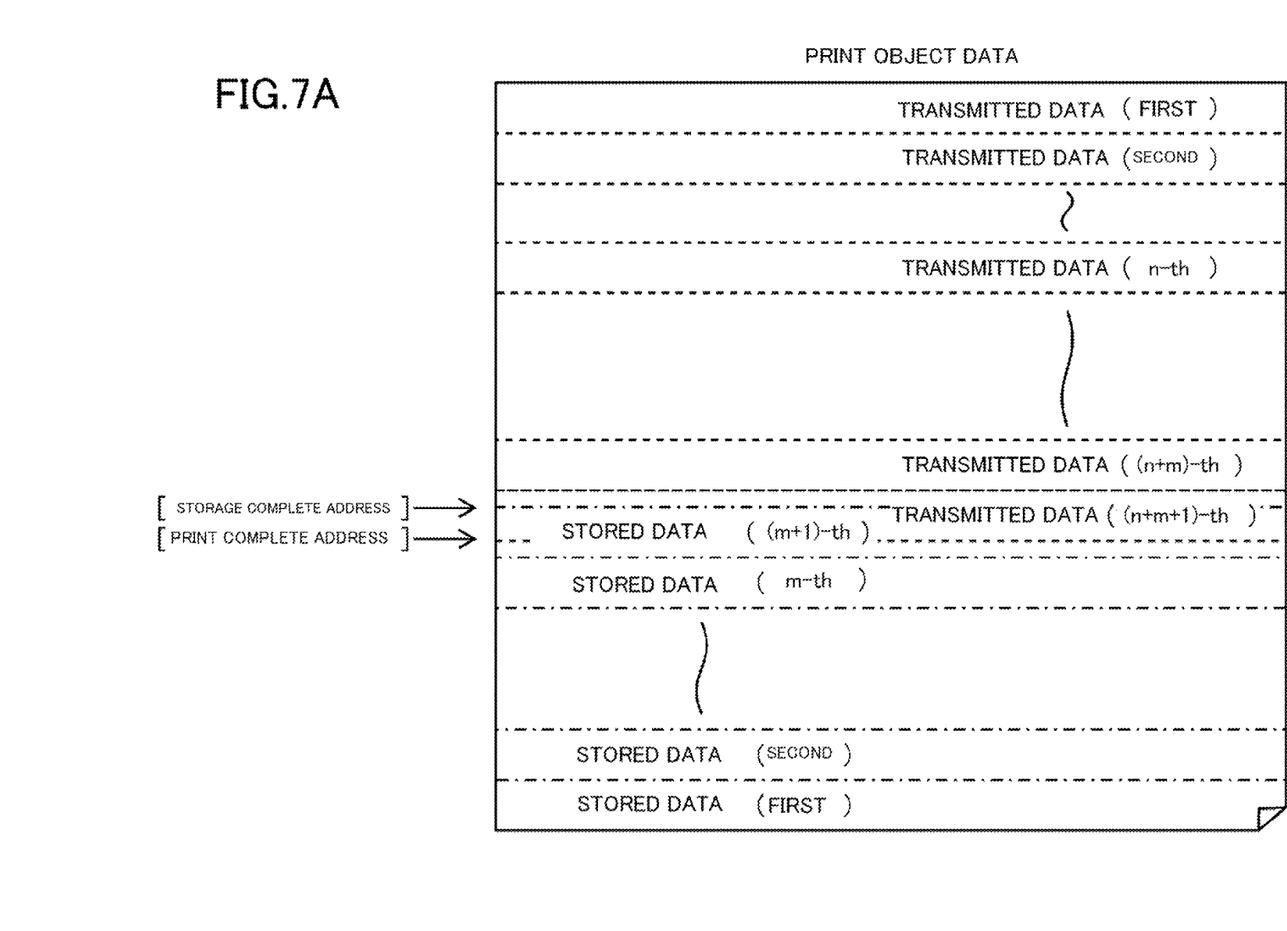
FIG. 7A is an explanatory diagram explaining a transition of a [print complete address] and a [storage complete address] in print object data stored in a RAM of a control unit illustrated in FIG. 2.
Figure 7B:
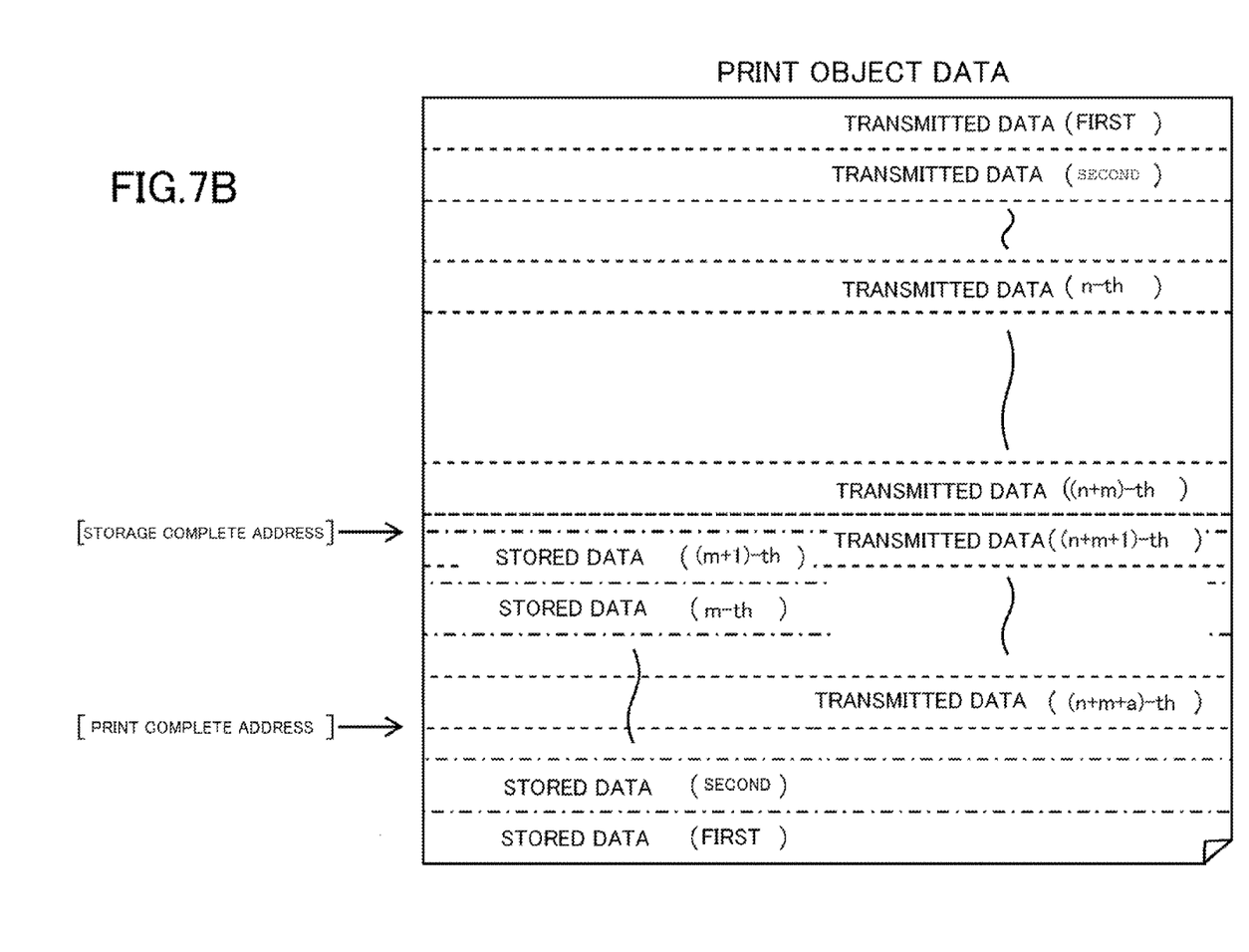
FIG. 7B is an explanatory diagram explaining a transition of a [print complete address] and a [storage complete address] in print object data stored in a RAM of a control unit illustrated in FIG. 2.

In FIG. 7A, a state is illustrated in which after the construction and the transmission of the print data are performed n times, the data storage process and the construction and the transmission of the print data are repeated m+1 times, and the [print complete address] is greater than or equal to the [storage complete address]. Subsequently, the data storage process is not performed in step A7, and until it is determined in step A5 that the transmission of all the data has been completed, the construction and the transmission of the print data are performed in steps A2 to A4. In FIG. 7B, a state is illustrated in which after the [print complete address] is greater than or equal to the [storage complete address], the construction and the transmission of the print data are performed a times.

The fact that the [print complete address] is greater than or equal to the [storage complete address] means that all the data of the print object data that is not transmitted as the print data is stored in the storage unit 13. Accordingly, even if a battery runs out, the follow-on print data is enabled to be reconstructed and transmitted on the basis of the image data stored in the storage unit 13.

Figure 8A:
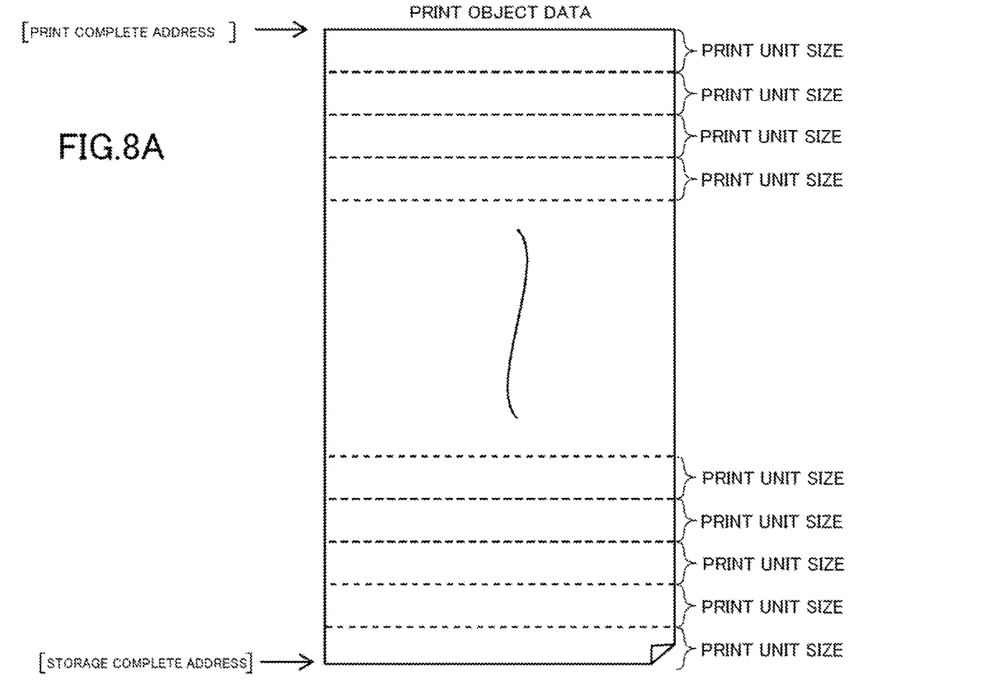
FIG. 8A is an explanatory diagram explaining a transition of a [print complete address] and a [storage complete address] in print object data stored in a RAM of a control unit illustrated in FIG. 2.
Figure 8B:
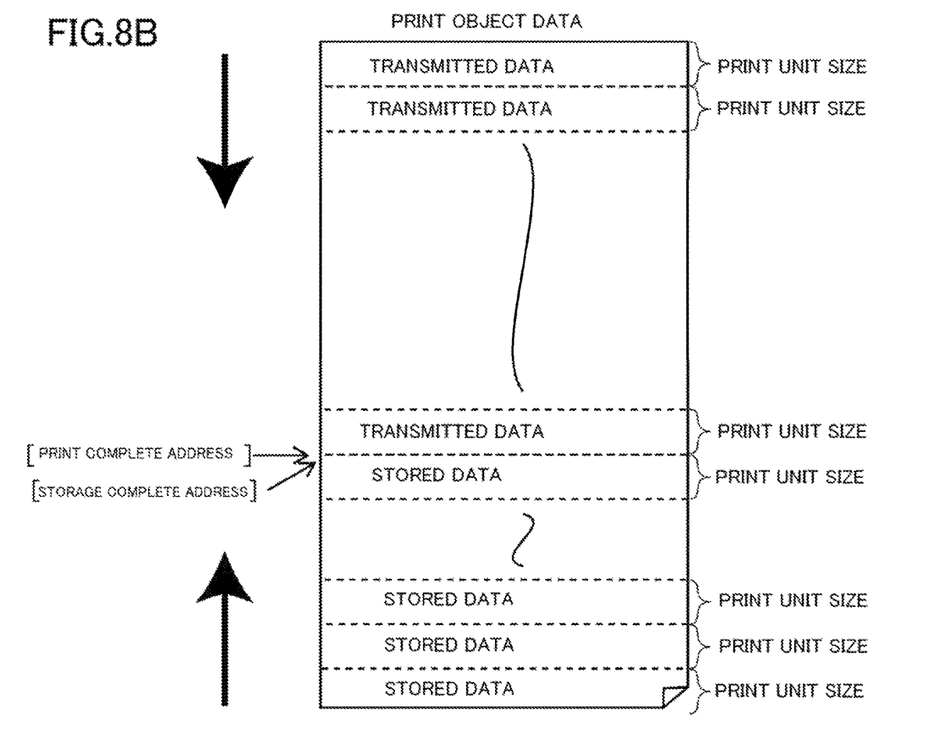
FIG. 8B is an explanatory diagram explaining a transition of a [print complete address] and a [storage complete address] in print object data stored in a RAM of a control unit illustrated in FIG. 2.

In the present embodiment, it is possible to set the [print unit size] and the [storage unit size] to arbitrary sizes with each other. Further, it is preferred that the [storage unit size] is set to a unit of the same definition as that of the [print unit size], and the print object data of the [print unit size] is converted to the image data and stored. When the page division data is used in the print object data, the [print unit size] and the [storage unit size] may be set to a page unit. On the other hand, when the page division data is not used in the print object data, the print data construction unit 151 previously divides the print object data into the [print unit size] (grasp each leading address), as illustrated in FIG. 8A. As illustrated in FIG. 8B by arrows, the print data construction unit 151 sequentially performs the construction and the transmission of the print data by the [print unit size] toward the data end position from the data start position of the print object data. At the same time, the data storage processing unit 152 sequentially performs the data storage process by the [print unit size] toward the data start position from the data end position of the print object data. As described above, the [storage unit size] is set to the same size as that of the [print unit size], and thereby the image data stored in the storage unit 13 is set in each [print unit size]. Therefore, it is possible to easily perform reconstruction of the print data on the basis of the image data stored in the storage unit 13.

As described above, according to the present embodiment, the portable terminal 1 that uses a battery as a power supply, constructs print data from print object data stored in a volatile storage unit, transmits the print data to an image forming device 2, and instructs the image forming device 2 to perform printing of the print data, includes the storage unit 13 that is a non-volatile storage unit, the remaining battery capacity detection unit 12 that detects the remaining battery capacity of the battery, the print data construction unit 151 that constructs the print data in each [print unit size] from the data start position of the print object data and transmits the print data to the image forming device 2, and the data storage processing unit 152 that performs the data storage process in which the print object data is stored in the storage unit 13 in each [storage unit size] toward the data start position from the data end position of the print object data when the remaining battery capacity detected by the remaining battery capacity detection unit 12 is smaller than or equal to a preset reference value during transmission of the print data by the print data construction unit 151.

This configuration enables untransmitted print object data as the print data to be efficiently stored in the storage unit 13 that is a non-volatile storage unit, and enables printing to be restarted by the print object data stored in the storage unit 13. Further, since only the print object data having a necessary size is enabled to be stored in the storage unit 13, it is possible to cope with even a case in which there is no sufficient free area in the storage unit 13. Further, since only the print object data having a necessary size is enabled to be stored in the storage unit 13, it is possible to minimize a time required to perform the data storage process. Accordingly, it is possible to suppress the possibility that a power supply is turned off in the middle of the storage and valuable print object data is lost.

In a typical portable terminal, there is a problem that in the case that a data size of the print object data for performing printing is large, when a battery runs out before finishing storing all the print object data in a non-volatile area, it is difficult to restart printing by the print object data stored in a halfway manner.

In view of the foregoing, it is an object of the present disclosure to provide a portable terminal and method that enable untransmitted print object data as print data to be efficiently stored in a non-volatile area, and enable printing to be restarted by the print object data stored in the non-volatile area.

The present disclosure achieves an advantageous effect of enabling untransmitted print object data as print data to be efficiently stored in a non-volatile storage unit, and enabling printing to be restarted by the print object data stored in the non-volatile storage unit.

Further, according to the present embodiment, in the data storage process of the data storage processing unit 152, the print object data in each [storage unit size] is converted to the image data and stored in the storage unit 13.

Even if the print object data is binary data of an HTML format, a Word format of Microsoft Corporation, or the like, this configuration enables the print data to be reconstructed from the stored image data.

Further, according to the present embodiment, when all the data of the print object data that is not transmitted as the print data by the print data construction unit 151 is stored in the storage unit 13, the data storage processing unit 152 stops the data storage process.

This configuration enables the remaining battery capacity to be used for continuation of the construction and the transmission of the print data after the print object data having a necessary size is stored in the storage unit 13.

Further, according to the present embodiment, the [storage unit size] is set to a unit of the same definition as that of the [print unit size], and the print object data of the [print unit size] is stored in the storage unit 13 in the data storage process of the data storage processing unit 152. The [storage unit size] is set to a page unit.

This configuration enables the print data to be easily reconstructed on the basis of the image data stored in the storage unit 13.

It is clear that the present disclosure is not limited to the above embodiments and the above embodiments can be suitably changed within a range of the technical idea of the present disclosure. The number, the position, the shape and others of the above members are not limited to those in the above embodiments, and the number, the position, the shape and others suitable for embodying the present disclosure can be selected. In each drawing, the same reference number is allocated to the same component.

What is claimed is:

1. A portable terminal that uses a battery as a power supply, constructs print data from print object data stored in a volatile storage unit, transmits the print data to an image forming device, and instructs the image forming device to perform printing of the print data, comprising:
    a non-volatile storage unit;
    a remaining battery capacity detection unit that detects a remaining battery capacity of the battery;
    a print data construction unit that constructs the print data in each print unit size from a data start position of the print object data and transmits the print data to the image forming device; and
    a data storage processing unit that performs a data storage process in which the print object data is stored in the non-volatile storage unit in each storage unit size toward the data start position from a data end position of the print object data when the remaining battery capacity detected by the remaining battery capacity detection unit is smaller than or equal to a preset reference value during transmission of the print data by the print data construction unit.

2. The portable terminal according to claim 1, wherein in the data storage process of the data storage processing unit, the print object data in each of the storage unit sizes is converted to image data and stored in the non-volatile storage unit.

3. The portable terminal according to claim 1, wherein when all of the print object data that is not transmitted as the print data by the print data construction unit is stored in the non-volatile storage unit, the data storage processing unit stops the data storage process.

4. The portable terminal according to claim 1, wherein the storage unit size is set to a unit of the same definition as that of the print unit size, and the print object data of the print unit size is stored in the non-volatile storage unit in the data storage process of the data storage processing unit.

5. The portable terminal according to claim 1, wherein the storage unit size is set to a page unit.

6. A method for instructing a portable terminal to construct print data from print object data stored in a volatile storage unit, transmit the print data to an image forming device, and perform a print data transmission operation in which the image forming device is instructed to perform printing of the print data, comprising:
    instructing the portable terminal including a battery as a power supply, the volatile storage unit, and a non-volatile storage unit to function as a print data construction unit, construct the print data in each print unit size from a data start position of the print object data, and transmit the print data to the image forming device, and instructing the portable terminal to function as a data storage processing unit and store the print object data in the non-volatile storage unit in each storage unit size toward the data start position from a data end position of the print object data when a remaining battery capacity detected by a remaining battery capacity detection unit is smaller than or equal to a preset reference value during transmission of the print data.

* * * * *